Aug. 28, 1934.   E. C. FURMAN ET AL   1,971,649
METHOD FOR SEALING APERTURES
Filed Dec. 30, 1933
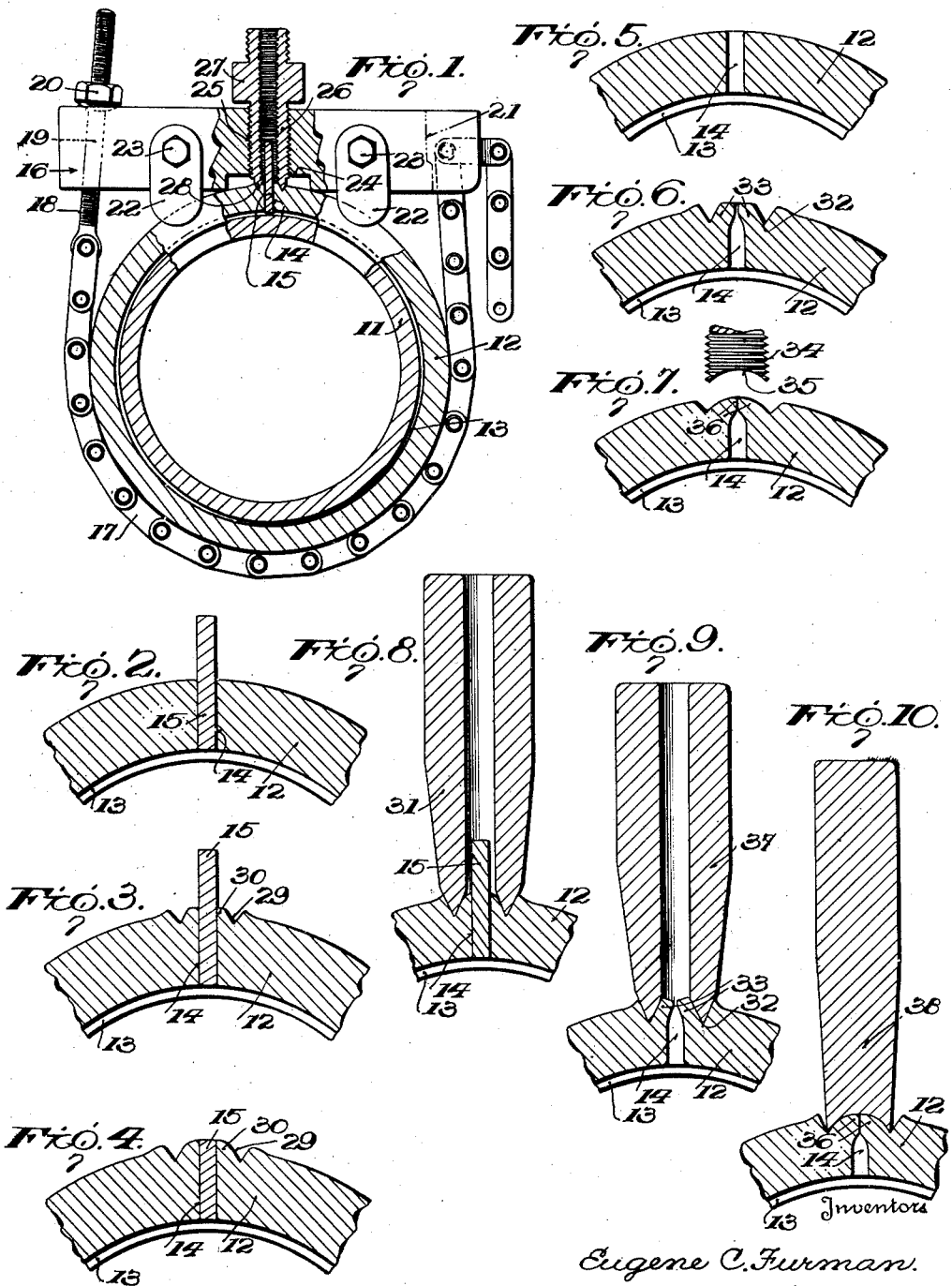
Eugene C. Furman.
Edmund F. Heard.
By Cameron, Kerkam+Sutton.
Attorneys Patented Aug. 28, 1934

1,971,649

UNITED STATES PATENT OFFICE 1,971,649

METHOD FOR SEALING APERTURES

Eugene C. Furman, Newport News, and Edmund F. Heard, Hampton, Va.

Application December 30, 1933, Serial No. 704,740

6 Claims. (Cl. 29—148.2)

This invention relates to a method, including process and apparatus, for closing apertures, particularly those formed in the elements of threaded joints.

In our co-pending application Serial No. 670,778, filed May 12, 1933, and entitled Method of sealing leaks in threaded joints, we have disclosed and claimed a method whereby a leaking threaded joint may be sealed without varying the pressure interiorly of the joint, where one of the elements of the joint is preliminarily provided within the area of its threaded surface with a circumferential groove or one or more sections of a circumferential groove at a location determinable from the exterior of the joint, by providing a hole from the exterior of the outer element of the joint to said groove or groove section, and then injecting a fluid or semi-fluid sealing medium into said hole and groove or groove section under a pressure sufficient to overcome the pressure interiorly of the joint and force the sealing medium into the intersurface spaces through which the leak is occurring, thereafter retaining the pressure on said sealing medium until it hardens in place by chemical or thermal action.

In our application Serial No. 704,738, entitled Method for sealing leaks in threaded joints, and filed of even date herewith, we have also disclosed a method for sealing leaks in threaded joints which are not provided preliminarily with a groove or groove section, but which also involves the providing of an aperture from the exterior of an element of the joint to the threaded surface thereof. Also, in our application Serial No. 704,739, entitled Method of loosening rusted threaded joints, and filed of even date herewith, we have disclosed a method whereby threaded joints the elements of which have become rusted or "frozen" together can be loosened so that said elements may be separated without destroying or injuring the same or the threads thereof and which also involves the provision of an aperture from the exterior of one of said elements to the exterior at the threaded surfaces. The present invention is concerned with a method for sealing such apertures as are formed in the practice of the methods referred to, although as will be apparent to those skilled in the art the present invention is also applicable to the sealing of apertures formed in members of other character and for other purposes.

As pointed out in our application Serial No. 670,778 above referred to, the hole formed through the outer joint element is filled and sealed by the sealing medium which hardens therein, and this plug of sealing medium which has hardened in the aperture may be relied upon as the permanent closure of said aperture. The same conditions also exist in the method of sealing leaks in threaded joints not preliminarily provided with a groove or groove section as pointed out in our application Serial No. 704,738. In either event, however, it may be desirable at some subsequent time to disconnect the members of the joint, and the act of disconnection may break or loosen the plug of sealing material formed in the aperture as above referred to, so that it is likely to be forced out by the pressure existing interiorly of the joint when the parts are reassembled and put in service. The present invention has for its object a method for so closing and sealing such apertures that the elements of the joints may be subsequently dismantled and used over again without impairing the serviceability of the joint elements.

Another object of this invention is to provide a method of the type characterized which can be used for closing and sealing such apertures as are formed in joint elements in the practice of the process disclosed in our application Serial No. 704,739, or as may arise in other ways or for other purposes, so as not to impair the future usefulness of the elements in which the apertures have been formed.

Another object of this invention is to provide a method of the type characterized which can be carried out with simple apparatus and without need for highly skilled labor. Other objects will appear as the description of the invention proceeds.

The method of the present invention can be carried out by apparatus of any suitable character, but for purposes of illustrating in detail the preferred practice of this method, suitable apparatus is shown on the accompanying drawing, but it is to be expressly understood that the present invention is not to be restricted to the use thereof.

In the drawing, wherein the same reference characters are employed to designate corresponding parts in the several figures—

Fig. 1 is an elevation partly in section of apparatus for calking a pin within the aperture;

Figs. 2, 3 and 4 are schematic fragmentary views to illustrate successive steps in the carrying out of the method of our invention according to one embodiment thereof;

Figs. 5, 6 and 7 are schematic fragmentary views illustrating successive steps in the carrying out of the method of our invention according to another embodiment thereof; and Figs. 8, 9 and 10 illustrate other tools that may be used in the practice of the method of our invention.

Referring first to the embodiment of the invention exemplified in Figs. 1 to 4, 11 and 12 indicate the inner and outer elements of a joint provided with an interior groove 13 as disclosed in an application Serial No. 670,778 heretofore referred to, although the invention is not limited to use with joint elements so constructed as heretofore explained. An aperture 14 has been formed in the outer joint element 12 as, for example, in the practice of any of the methods disclosed in our applications heretofore identified. If said aperture has been used for the purpose of injecting therethrough a sealing medium as heretofore referred to, the sealing medium left in the aperture is removed in any suitable way—as by drilling, for example, if the sealing medium has already hardened in said aperture. A pin 15, which may be cylindrical or slightly tapered if preferred, is then driven into said aperture 14, said pin preferably being of such size that it will snugly fill the aperture 14 but without exerting any such wedging or bursting pressure on said element 12, when forced thereinto, as to break or injure the same.

When the pin 15 is in position the metal around the pin is calked against the pin in any suitable way so as to lock the pin against dislodgment. The preferred apparatus for effecting this purpose is illustrated in Fig. 1, and constitutes a part of an apparatus designed for permitting drilling, injecting and calking operations to be performed on the joint with the use of a single rig without removal of the rig from the joint, and which apparatus is made the subject of a separate application filed by us of even date herewith, Serial No. 704,741, and entitled Drilling and injecting apparatus.

As shown in Fig. 1, said apparatus includes a clamp bar 16 which may be firmly secured to the periphery of the element 12 in any suitable way, but preferably by means which is adjustable in length so as to be usable on elements of varying diameters. As shown, a flexible chain 17 is attached at one end to a threaded stem 18 which passes through an aperture 19 in the bar 16 and has an adjustable nut 20 threaded thereon for cooperation with the face of said clamp bar. The opposite end of the clamp bar is provided with a recess 21 in which the free end of the chain may be detachably engaged and locked in position. As here shown, a pair of positioning elements 22 may also be attached to one face of the bar 16, as by bolts or screws 23, to locate said bar with respect to the end face of the element 12 when the aperture 14 is formed at a predetermined distance from the end of the element 12, although these positioning elements may be omitted if desired. The inner face of bar 16 is provided with a recess 24, and communicating with said recess 24 is a threaded aperture 25 which is adapted to receive an exteriorly threaded calking element for the operation about to be described. As shown, the calking element 26 has an exteriorly threaded shank adapted to thread into the aperture 25 and an enlarged portion 27 suitably shaped so that it may be engaged and manipulated by a wrench. At its inner end said calking element is formed as a hardened and sharpened annular edge 28 that is adapted to bite into the metal and distort or displace the same.

Referring now to Figs. 2, 3 and 4, and assuming that the pin 15 has been suitably located in the aperture 14, the calking element 26 is rotated in its aperture 25 so as to force its hardened and sharpened edge 28 into the metal of the joint element 12, as shown in Fig. 3, forming a groove 29 and simultaneously displacing or squeezing the metal against the pin 14 so as to tightly grip and clamp said pin at 30. Thereafter the pin may be cut off flush with the surface of the element 12 as shown in Fig. 4 and, if preferred, the metal may be further peened or displaced around the end of the pin 14 so as to further assure against dislodgment thereof.

In place of a rotary calking tool as shown in Fig. 1, a hollow calking tool that is operated by a hammer may be employed, as shown at 31 in Fig. 8. Otherwise the method as diagrammatically illustrated in Figs. 2, 3 and 4 is employed.

Another embodiment of the method of the present invention is diagrammatically indicated in Figs. 5, 6 and 7, this method possessing the advantage that it is not necessary to remove all of the sealing material from the aperture if the aperture has been used for the injection of sealing material into a leaking joint. Fig. 5 illustrates the element 12 with the aperture 14 formed therein, and according to this embodiment no pin is introduced into said aperture 14 but a calking element of the character illustrated in Fig. 1 is forced into the metal surrounding the aperture 14 so as to displace inwardly the metal at the mouth of said aperture, thereby forming a groove 32 comparable to the groove 29 but distorting the metal at 33 so as to nearly, if not quite, close said aperture. A peening tool such as diagrammatically indicated at 34 is then threaded into the aperture 25 and used to complete the closure of the aperture 14. Said tool has a concave end 35 which is adapted to engage the distorted and displaced metal 33 and by the combined pressure and rotary action of the concave end of said tool, as it is advanced through the aperture 25, the metal at 36 is further displaced and distorted so as to form a complete and fluid-tight closure for said aperture, as shown in Fig. 7.

In place of using rotary calking and peening tools, as above described, calking and peening tools adapted to be operated by hammers may be employed to effect the same series of operations, as indicated in Figs. 9 and 10, wherein 37 indicates the hammer-operated calking tool and 38 indicates the hammer-operated peening tool.

It will therefore be perceived that by the present method an element which has been provided with an aperture, as for any of the purposes heretofore referred to, may have its aperture completely closed and sealed, so that the elements of the joint may be subsequently dismantled and reassembled without impairing the usefulness or serviceability of the element which has been provided with the aperture.

While certain embodiments of the method of the present invention have been described with considerable particularity, and certain apparatus suitable for the carrying out of the same has been illustrated and described in detail, it is to be expressly understood that the invention is not restricted thereto, as it is susceptible of receiving other embodiments as will now be apparent to those skilled in the art. Reference is therefore to be had to the appended claims for a definition of the limits of the invention.

What is claimed is:—

1. A method for sealing apertures formed in threaded joints of the character described which includes the steps of forcing into the metal surrounding the aperture a rotary calking tool which distorts and displaces the metal uniformly inward around said aperture so as to deflect the metal across the mouth of the aperture and effect a fluid-tight sealing of said aperture.

2. A method for sealing apertures formed in threaded joints of the character described which includes the steps of inserting into the aperture a pin which snugly fills said aperture, forcing into the metal around said pin a calking tool which distorts and displaces the metal around said aperture so as to tightly grip said pin against displacement by interior pressure and form a fluid-tight closure of said aperture, and then cutting of said pin flush with the face of the apertured element.

3. A method for sealing apertures formed in threaded joints of the character described which includes the steps of forcing a calking tool into the metal surrounding the mouth of the aperture so as to distort and displace the metal around said mouth inwardly to substantially close said aperture, and thereafter subjecting the displaced metal to a peening operation around said aperture to form a fluid-tight closure thereof.

4. A method for sealing apertures formed in threaded joints of the character described which includes the steps of forcing a calking tool into the metal surrounding the mouth of the aperture so as to distort and displace the metal around said mouth inwardly to substantially close said aperture, and thereafter subjecting the displaced metal to combined pressure and rotary action around the axis of the aperture to peen the metal at the mouth of said aperture into a fluid-tight closure.

5. A method for sealing apertures formed in threaded joints of the character described which includes the steps of inserting into said aperture a pin which snugly fills the same, and subjecting the metal around said pin to combined pressure and rotary action around the axis of the pin to calk said metal into a position wherein it tightly grips said pin.

6. A method for sealing apertures formed in threaded joints of the character described which includes the step of subjecting the metal surrounding the mouth of the aperture to combined pressure and rotary action around the axis of the aperture to displace said metal and effect a fluid-tight closure at the mouth of the aperture.

EUGENE C. FURMAN.
EDMUND F. HEARD.